United States Patent [19]

Fried et al.

[11] 4,431,397
[45] * Feb. 14, 1984

[54] APPARATUS FOR PRODUCING MOLDED PLASTIC ARTICLES

[76] Inventors: Robert P. Fried, Hollow Rd., Staatsburg, N.Y. 12580; Bernard Rottman, Hyde Park Estates, Hyde Park, N.Y. 12538; Thomas W. Stark, Jr., Schultz Hill Rd., Rhinebeck, N.Y. 12572

[ * ] Notice: The portion of the term of this patent subsequent to Dec. 14, 1999 has been disclaimed.

[21] Appl. No.: 953,707

[22] Filed: Oct. 23, 1978

[51] Int. Cl.³ .............................................. A01J 25/12
[52] U.S. Cl. ..................... 425/384; 425/403; 425/436 R; 425/437; 425/457; 249/66 A; 249/66 C; 249/137; 249/175
[58] Field of Search ............... 425/384, 403, 436, 437, 425/457; 249/66 A, 66 C, 137, 175

[56] References Cited

U.S. PATENT DOCUMENTS

| | | | |
|---|---|---|---|
| 2,907,070 | 10/1959 | Van Hartesveldt | 425/384 |
| 3,177,275 | 4/1965 | Brenner | 264/121 |
| 3,501,125 | 3/1970 | Fransson | 249/137 |

*Primary Examiner*—James R. Hall
*Attorney, Agent, or Firm*—Martin J. Spellman, Jr.

[57] ABSTRACT

An apparatus and process for forming molded articles from particulate plastic material. A hollow heat-conductive male mold is surrounded with particulate plastic material. Heat is applied to the interior of the mold until the temperature of the outer surface is above the fusion temperature and below the melting temperature of the particulate plastic material. This temperature is maintained until an article of desired thickness is formed. Thereafter, loose particulate material is removed from the outer surface of the molded article and heat is again applied to the interior of the mold so as to cause the outer surface of the molded article to become smoother. Finally, the article and mold are cooled and the article is removed from the mold.

16 Claims, 35 Drawing Figures

APPARATUS FOR PRODUCING MOLDED PLASTIC ARTICLES

BACKGROUND OF THE INVENTION

The present invention relates to a process and apparatus for molding plastic articles from particulate plastic material.

There are various techniques for molding plastic articles known in the art, each of which has its own particular advantages and disadvantages. The most common of these techniques is injection molding wherein liquid plastic is injected into a mold and subsequently cooled. While injection molding is the least expensive process available for forming plastic articles in large quantity, the high cost of producing a mold makes its use with low volume work prohibitively expensive. In addition, the injection mold must be quickly cooled to permit its repetitive use at high volume, and such cooling creates stresses within the plastic article that may result in cracks.

Another technique for producing molded plastic articles is called thermoforming. In this process a plastic sheet is heated and stretched onto a mold. While thermoforming is exceptionally useful for shallow articles, plastic articles of any substantial depth exhibit internal stresses and weaknesses which may result in cracks. In addition, the sheet plastic used as the raw material is somewhat more expensive than the pellets or powder used in injection molding.

A still further technique for producing molded plastic articles is known as rotational molding. In this process a fixed charge of plastic is placed within a female mold, and the mold is rotated. During rotation, heat is applied to the outside of the mold to cause the plastic to melt. With this process, energy use is relatively high and the mold is expensive to produce. In addition, the plastic article, although smooth on the outside which contacts the mold, may have a relatively rough surface on the inside. Such a rough surface is a disadvantage when the article is to be used as a container.

It is an object of the present invention to provide a process and apparatus for forming plastic molded articles for which the tooling cost for molds is lower than for other plastic molding processes known in the art.

It is a further object of the present invention to provide a process and apparatus for forming molded plastic articles which requires a minimum of capital expenditure for a complete molding machine.

It is a further object of the present invention to provide a process and apparatus for forming molded plastic articles which permit the wall thickness of each article to be controlled within fine tolerances.

It is a further object of the present invention to provide a process and apparatus for forming molded plastic articles such that the articles exhibit very little internal stress.

These objects, as well as other objects which will become apparent from the discussion that follows, are achieved, according to the present invention, by means of the following process: A hollow-heat-conductive male mold is surrounded with particulate plastic material. Heat is applied to the interior of the mold until the temperature of the outer surface is above the fusion temperature and below the melting temperature of the particulate plastic material. This temperature is maintained until an article of desired thickness is formed. Thereafter, loose particulate material is removed from the outer surface of the molded article and heat is again applied to the interior of the mold so as to cause the outer surface of the molded article to become smoother. Finally, the article and mold are cooled and the article is removed from the mold.

This process lends itself to an extremely low tooling cost for each different article to be formed. The heat conductive male mold may be formed of sheet material which is welded together and sanded smooth. Aircraft quality aluminum is the preferred material although other heat-conductive materials may also be used for the mold.

Because no stresses appear in the material as the article is forming, internal stresses do not develop unless the article is cooled quickly. The wall thickness of the molded article formed by this process may be precisely controlled by controlling the time during which heat is applied to fuse the particulate plastic material together.

Finally, the cost of the apparatus according to the invention for carrying out the process is extremely modest in comparison with the capital investment required to purchase apparatus to carry out other, prior art, plastic molding processes.

For a better understanding of the invention, together with other and further objects, reference is made to the following description, taken in conjuction with the accompanying drawings.

DESCRIPTION OF THE PREFERRED EMBODIMENTS

Figure 1:
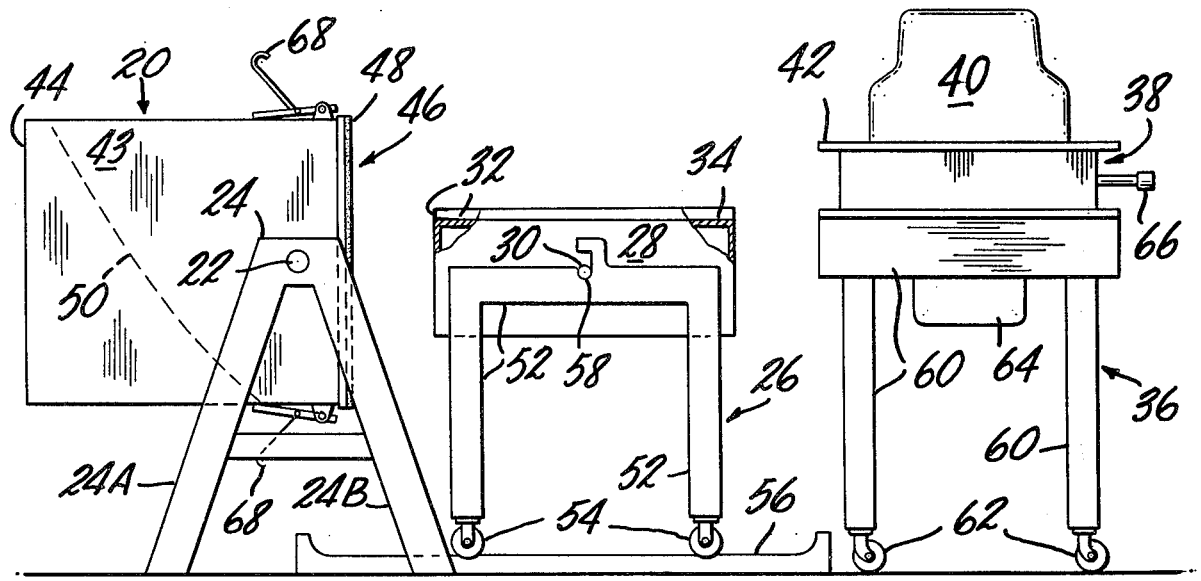
FIG. 1 is a side elevational view of one embodiment of apparatus, according to the present invention, for forming molded plastic articles from particulate plastic material.

The preferred embodiments of the present invention will now be described with reference to FIGS. 1-19 of the drawings. Corresponding elements in the various figures are designated with the same reference numerals.

FIG. 1 illustrates the essential elements of the plastic molding apparatus according to the present invention. This apparatus includes an enclosure or container 20 pivotally mounted by means of shafts 22, extending from its opposite sides, on a frame 24 having legs 24A and 24B. A first transport unit 26 carries a "heat box" 28, which will be described in detail below. The heat box 28 is removably and pivotally mounted on the transport unit 26 by shaft ends 30 extending from its opposite sides. U-shaped guide members 32 are welded around three sides of the upper surface of the heat box 28, as shown in cross section in the upper left-hand corner, leaving open the side 34 directed toward the right, in the figure, as shown in cross section in the upper right hand corner.

A second transport unit or dolly 36 carries a mold platen 38 and a hollow male mold 40. The mold platen 38 has a lower plate 41 which is dimensioned to engage the U-shaped guides 32 on the heat box 28 and an upper flange 42 which extends outward for the base of the mold.

The pivoted container 20 is preferably a rectangular structure made of a relatively strong, non-heat conductive material such as wood or a laminate formed of sheet metal and heat insulation. The container 20 is formed by four side walls 43 and a rear wall 44, thereby leaving a front opening 46. A strip of resilient material 48 is disposed on the face edges of the front opening of the container for forming a leakproof seal with the flange 42 when the mold 40 is inserted into the front opening. The container is loaded with particulate plastic material, the surface of which is indicated by the dashed line 50.

The first transport unit 26 comprises a frame 52 having wheels 54 arranged to roll on a track 56 fixed to the floor. The frame 52 has a recess 58 on each side to accommodate the pivot shaft ends 30.

The second transport unit 36 comprises a frame 60 arranged on castor wheels 62. The platen 38 is placed on top of the frame 60 and supports the hollow male mold 40. A cooling air fan is arranged in a housing 64 at the lower side of the frame 60 for cooling the mold in a manner to be described in detail below. An air inlet 66, which extends from the platen 38, serves for air ejection of the plastic molded article from the mold 40, as will be explained in detail below. The mold itself is preferably made of heat-conductive material, such as aluminum, and has an outer surface configuration corresponding to the desired inner surface configuration of the article to be molded. FIG. 1 shows a typical mold for a rectangular stepped container.

Figure 2A:
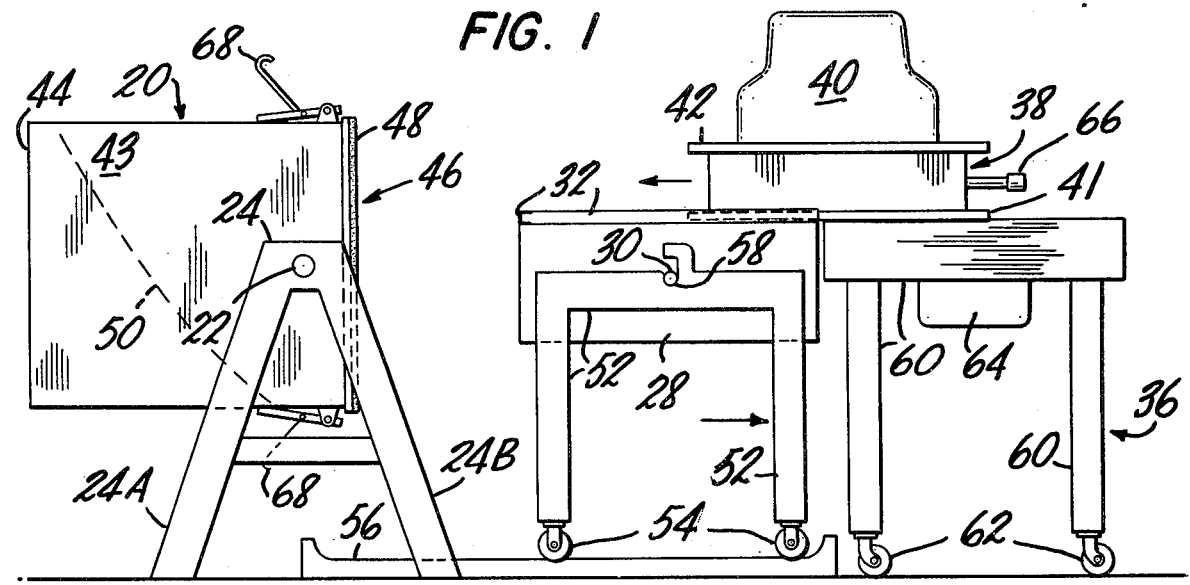
FIGS. 2A-2H are side elevational views of the apparatus of FIG. 1 illustrating how this apparatus is used for the molding process according to the present invention.
Figure 2B:
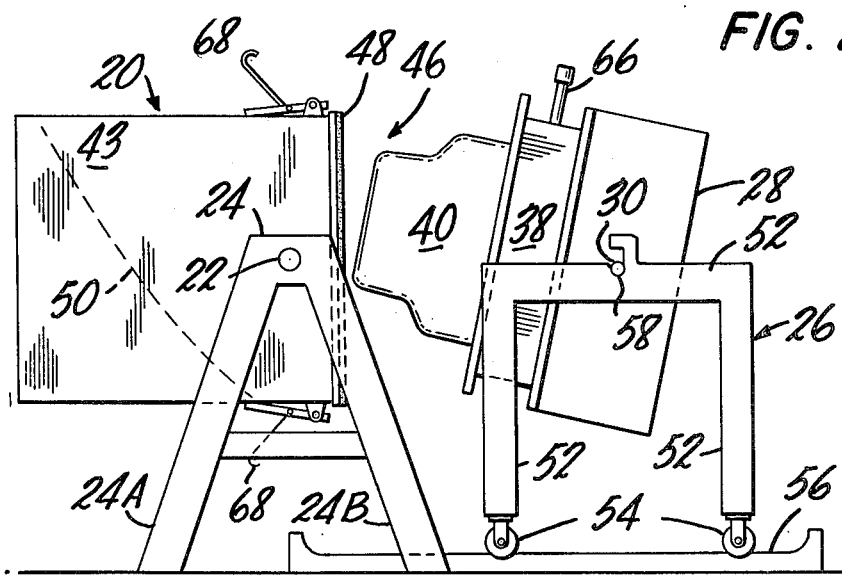
Figure 2C:
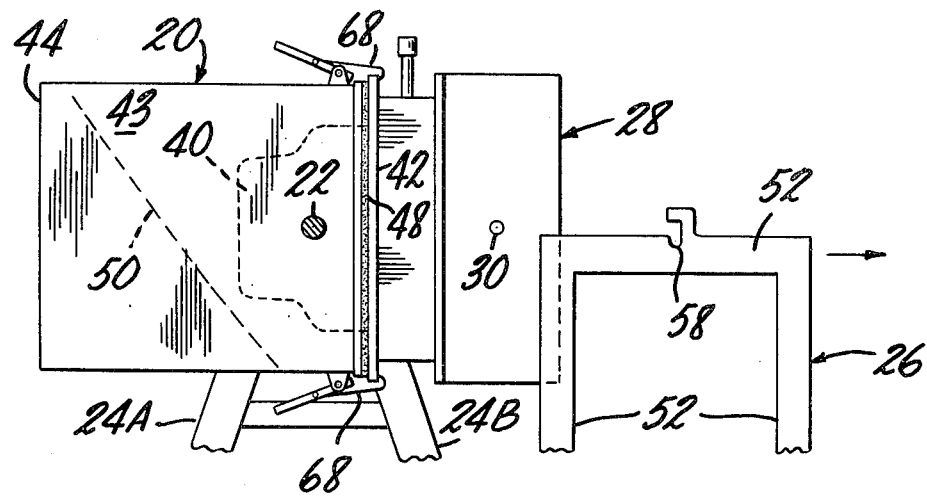

The operation of the plastic molding apparatus will now be described with reference to FIGS. 2A-2H. As shown in FIG. 2A, the mold 40 and platen 38 are slid together from the transport unit 36 onto the heat box 28 until the lower plate 41 engages the U-shaped guides 32 on all three sides. Thereafter, as shown in FIG. 2B, the heat box 28, with the platen 38 and mold 40 are pivoted together to arrange the mold in alignment with the opening 46 of the container 20. The transport unit 26 is then moved toward the left along the track 56 to bring the mold 40 inside the container 20. As shown in FIG. 2C, the flange 42 at the base of the mold 40 is brought into flat engagement with the sealing strip 48 and the entire heat box, platen and mold combination are attached to the container 20 by clamping hooks 68. The transport unit 26 is then rolled away from the assembled apparatus to permit rotation of the container.

Figure 2D:
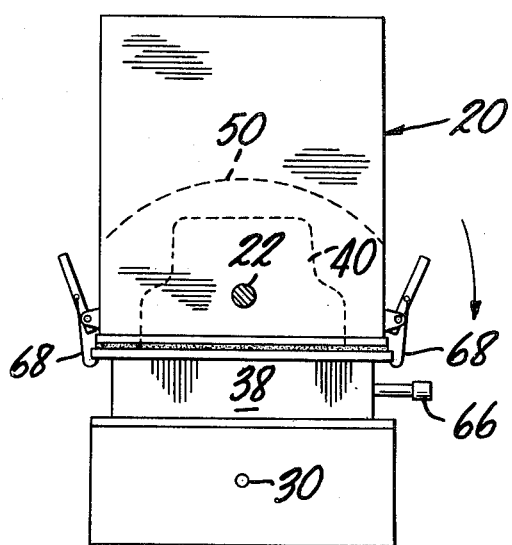

The combined heat box, platen, mold and container are next rotated through a 90° arc about the pivot shafts 22 so that the opening 46 and mold 40 are at the bottom of the container 20, as shown in FIG. 2D. The particulate plastic material indicated by the dashed lines 50 then falls by gravity toward the opening 46 of the container 20 and surrounds the mold 40. At this point, heat is applied to the inside surface of the mold 40 from the heat box 28, in a manner to be described below. The application of heat causes a layer of the particulate material to fuse together and attach itself to the outside surface of the mold 40.

Figure 2E:
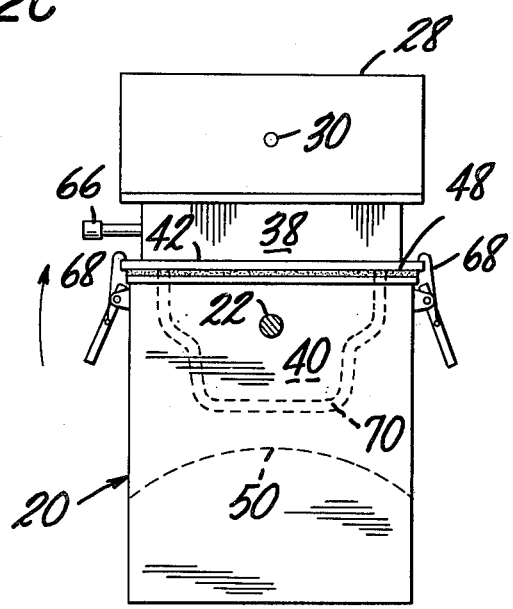
Figure 2F:
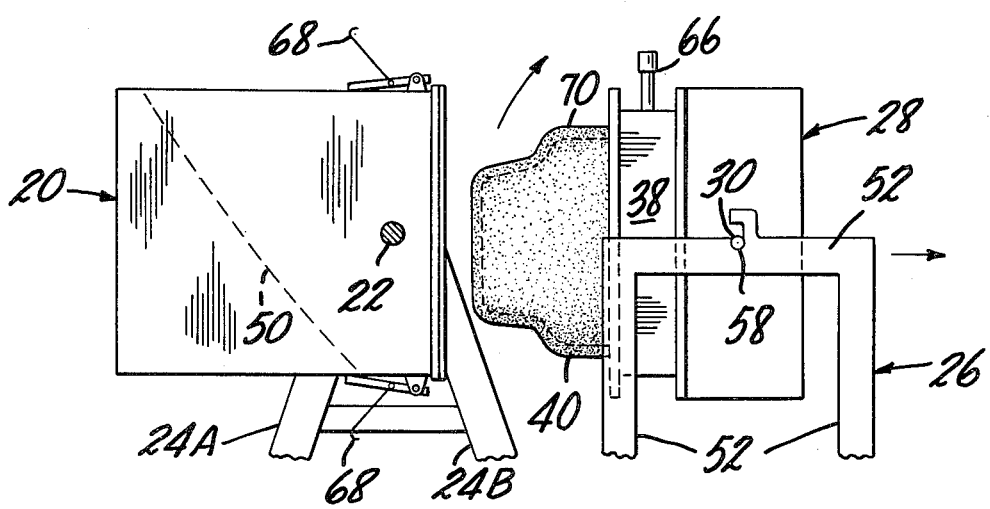

Following the application of heat for the desired time, in accordance with the guidelines set forth below, the combined heat box, platen, mold and container are rotated together through a 180° arc about the shafts 22, as shown in FIG. 2E. This movement causes that portion of the plastic particulate material which has not become fused to fall toward what is now the bottom of the container 20, revealing a fused layer 70 of plastic material on the mold 40 having an inner configuration which corresponds to the configuration of the outer surface of the mold. At this point, heat is applied for a shorter period of time so as to "fuse out" the outside surface of the fused plastic material, allowing it to become smoother. Following the fusing out step, the combined pivoted apparatus is rotated again through a 90° arc to return the parts to the same relative position as initially when the mold, platen and heat box were clamped to the container 20. The transport unit 26 is then brought into position so as to support the pivot shaft ends 30 on opposite sides of the heat box in the recesses 58. The clamping hooks 68 are released and the assembled mold 40, including a newly fused article 70 of plastic, the paten 38 and the heat box 28 are withdrawn away from the container 20 as shown in FIG. 2F.

The assembled mold, platen and heat box are pivoted through a 90° arc so that the mold is positioned atop the platen and heat box. The mold and platen are then moved horizontally onto the second transport unit 36, as indicated in FIG. 2G, and transport unit 36 is wheeled away from the vicinity of the container 20 and the transport unit 26 so that the mold 40 and fused article 70 may be further cooled.

Figure 2G:
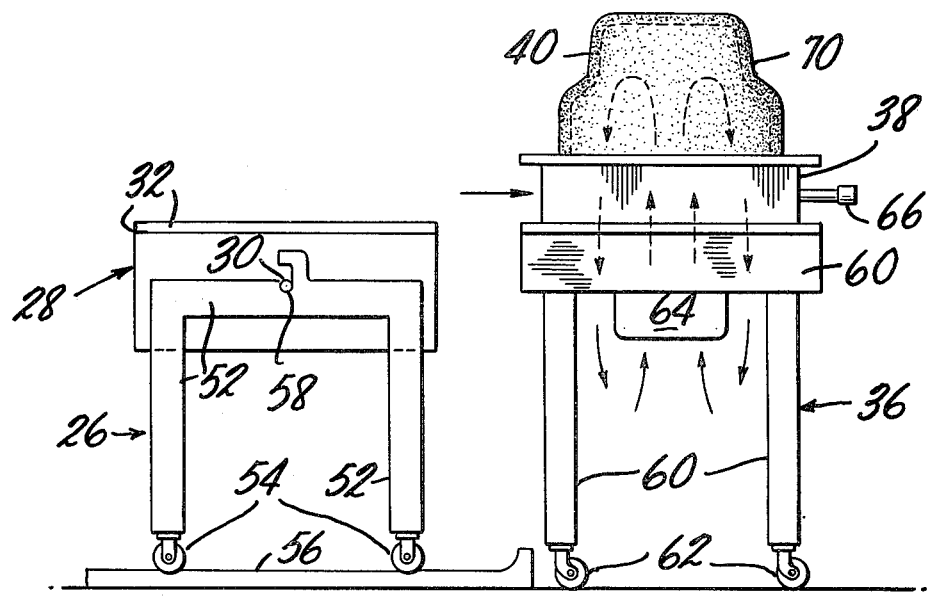

As shown in FIG. 2G, the fan in the housing 64 circulates room air upwards into the cavity of the mold 40. This air contacts the warm inner surface of mold and draws heat from the mold and from the hot plastic material surrounding the mold. The fused article 70 is thereby cooled to a point at which the article may be removed from the mold.

Figure 3:
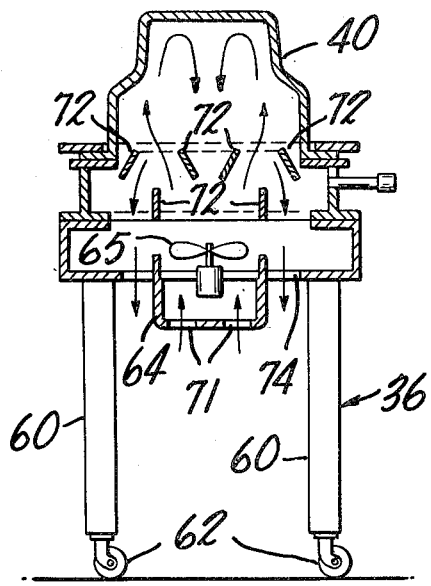
FIG. 3 is a side view of the cooling stand in FIG. 1 showing various parts in cross-section.

The circulation of air is illustrated in greater detail in FIG. 3, which shows a fan 65 located in the housing 64 at center of the transport unit 36. Openings 71 in the housing 64 permit room air to be drawn into the fan 65. The thus-propelled air is guided by baffle plates 72 in the platen 38 towards the inner surface of the mold 40, and exits through openings 74.

Figure 2H:
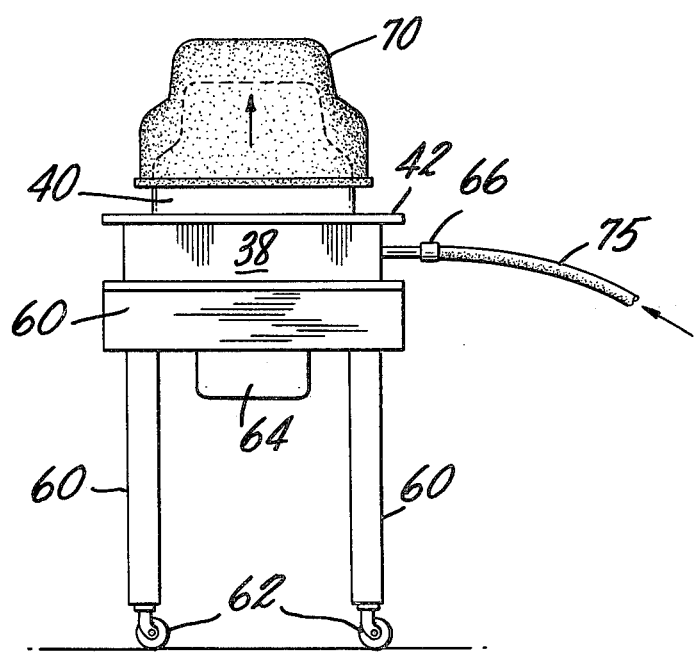

When the fused and cooled plastic article 70 is to be removed from the mold, the air inlet 66 is connected via a suitable hose 75 to a source of compressed air, or other gas. This air is directed to the outside surface of the mold, thereby lifting off the plastic article, as shown in FIG. 2H.

Figure 4:
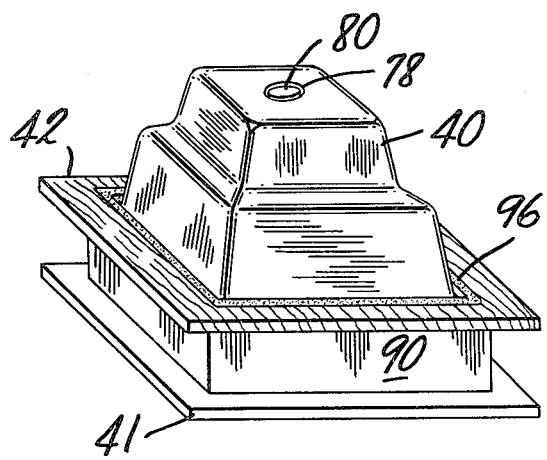
FIG. 4 is a perspective view of the mold and platen in the apparatus of FIG. 1.
Figure 5:
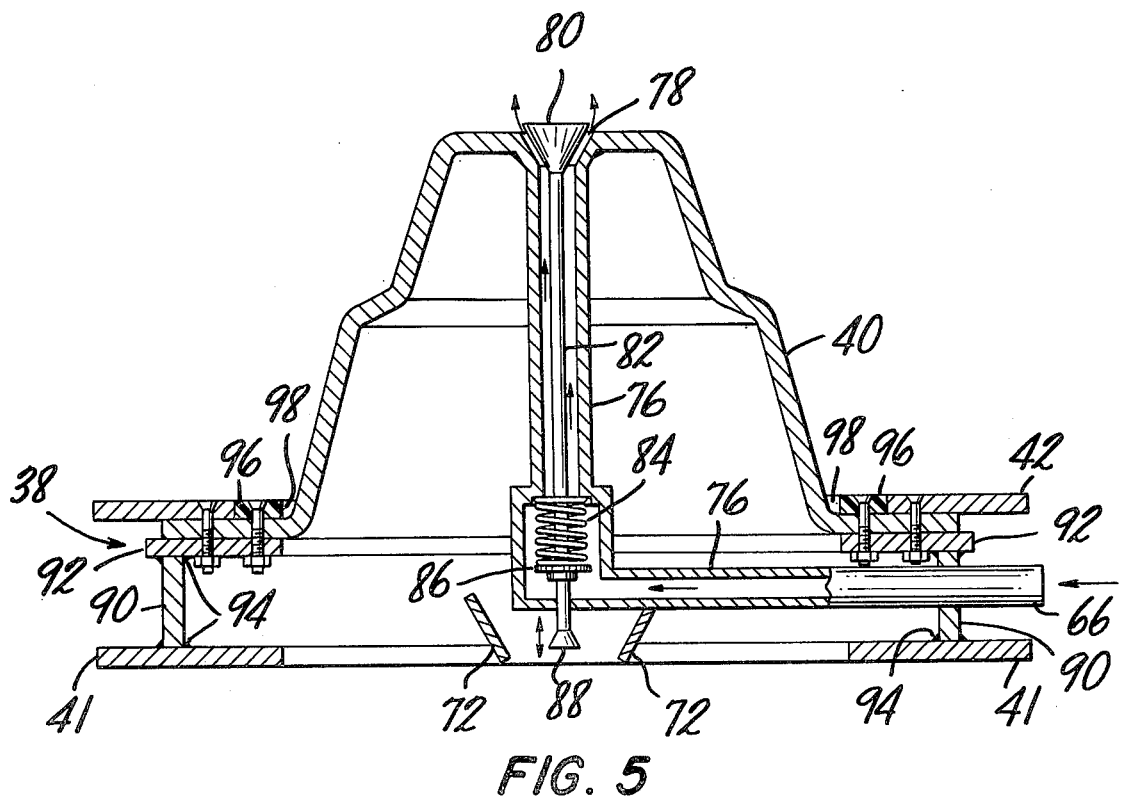
FIG. 5 is a cross-sectional view of the mold and platen of FIG. 4.

The valve apparatus within the mold 40 for applying compressed air is shown in greater detail in FIGS. 4 and 5. With reference to FIG. 5, the air inlet 66 communicates via tubes 76 with an opening 78 at the top center of the mold 40. The opening 78 is normally closed by a valve head 80, which is attached to a valve stem 82. A helical spring 84, concentric with the stem 82, acts on a valve stem plate 86 to bias the valve head 80 in a direction closing the opening 78. The application of air under pressure to the air inlet 66 overcomes the force of the spring 84, dislodges valve head 80 from the opening 78, and permits the air to enter the space between the outer surface of mold 40 and the inner surface of plastic article 70. If for some reason the valve head 80 is stuck, it may be dislodged by tapping gently with a hammer on the stem end 88.

While the valve apparatus for applying compressed air is shown in FIGS. 4 and 5 as comprising only a single opening 78 and valve head 80, it will be appreciated that air may be directed to a plurality of openings, with corresponding valve heads, located at various points on the outer surface of the mold.

The structure of the mold platen 38, and the manner in which the mold 40 is attached thereto, are also shown in FIGS. 4 and 5. As is best illustrated in FIG. 5, the platen 38 is constructed from two horizontal metal plates 41 and 92 which are separated and held in position by four vertical metal plates 90 forming a box. The plates 41, 90 and 92 are joined together by welds 94 along their edges. Both horizontal plates 41 and 92 have openings at their centers to permit air to pass freely into the interior of the mold 40.

The base of the metal mold 40 is bolted to the upper surface of the plate 92. An upper flange 42, which is made of a non-heat cnductive material such as wood, surrounds the mold at some distance therefrom and is bolted to the plate 92 together with the mold base. The space between the inside edge of the upper flange 42 and the lower-most non-horizontal portion of the mold 40 is filled, in part, by a circumferential strip 96 of non-adhering material such as Teflon. This arrangement leaves a small space 98 immediately adjacent to the base of the mold 40 which may be filled with particulate material during the molding process. A sharp clean line about the open edge of the finished, molded article is created by the inner face of the strip 96 of non-adhering material.

In the alternative, it is possible to extend the upper flange 42 inward toward the mold, thereby omitting the strip 96. Any rough edges appearing on the finished molded article may be removed by cutting and/or sanding.

Figure 6:
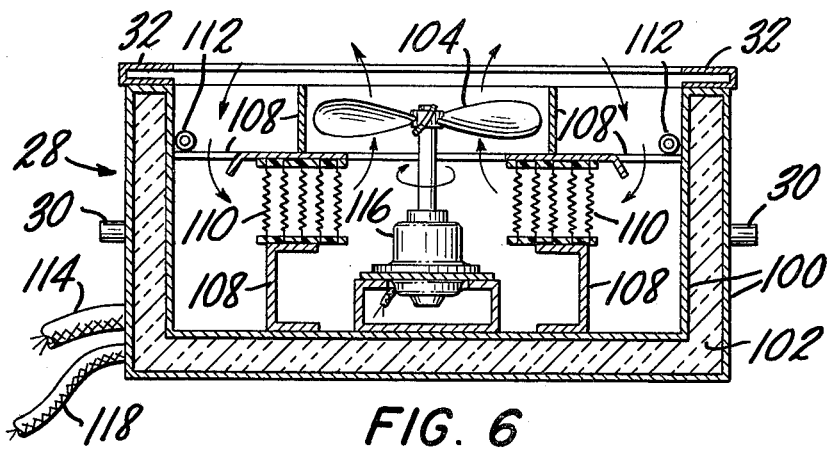
FIG. 6 is a cross-sectional view of the heat box in the apparatus of FIG. 1.

FIG. 6 shows the structure of the heat box 28 in detail. The internal and external surfaces of this box are made of metal sheet 100 which surrounds insulation 102. As mentioned previously, the upper end of the box is provided with U-shaped guides 32 for the base plate 41 of the mold platen 38. A fan 104 is centrally positioned to force air through the open face of the box, in the directions indicated by the arrows, with the assistance of baffles 108. Heating elements 110 are positioned below the blades of a fan 104 so that the fan forces heated air up into the interior of the mold 40 when the mold is positioned above the open face of the heat box. These heating elements are controlled by thermocouples 112 arranged in the path of air flowing through the box. Electrical leads 114 supply power to the fan motor 116 and to the heating elements 110. Another cable 118 carries control signals from the thermocouples 112.

The electric circuit for the heat box 28 is connected to operate as follows: Electrical power is supplied to the fan motor 116 through a timer which turns the motor on during the precise periods that heat is to be applied to the mold. The heating elements 110 are separately connected to the power source when the fan is on through switches controlled by the thermocouples 112. When rapid heating of the mold 40 is desired, as when the mold has first been inserted into the container 20, power is applied to all of the heating elements. When the air circulating through the heat box reaches a first temperature determined by one thermocouple, some of the heating elements (for example, one-half of these elements) are disconnected from the power source while the remaining elements are left connected. If and when the air circulating through the heat box reaches a second, higher temperature determined by the other thermocouple, the power is disconnected from all of the heating elements. Thus, the two thermocouples 112 are each set to respond at one of the two different temperatures, thereby providing signals on the electrical leads 118 to control the power to the heating elements 110.

Figure 7:
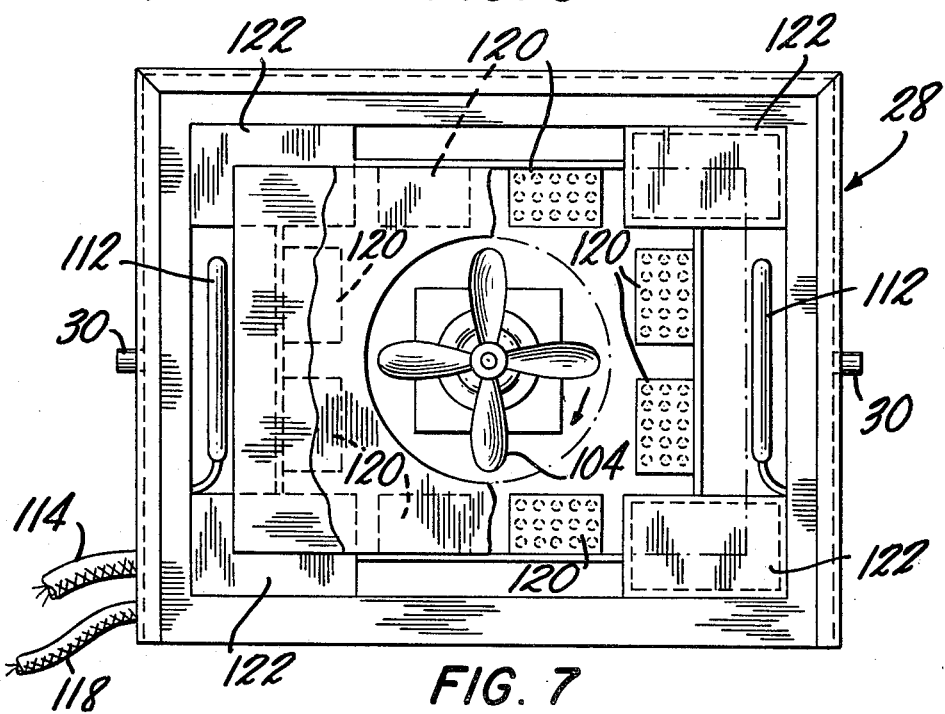
FIG. 7 is a top view of a modified form of heat box which may be used in the apparatus of FIG. 1.

While small heat boxes for small molds may be provided with heating elements arranged in only two banks on either side of the fan, as shown in FIG. 6, larger molds require correspondingly greater amounts of heat. FIG. 7 illustrates an alternative arrangement of a heatbox with eight banks of heating elements 120 arranged in pairs around the fan 104. Two thermocouples 112 are provided as in the embodiment of FIG. 6, in the path of air that recirculates through the box. Rectangular posts 122 are provided at the four corners of the box so that the air is constrained to flow through the heating elements 120.

Figure 8:
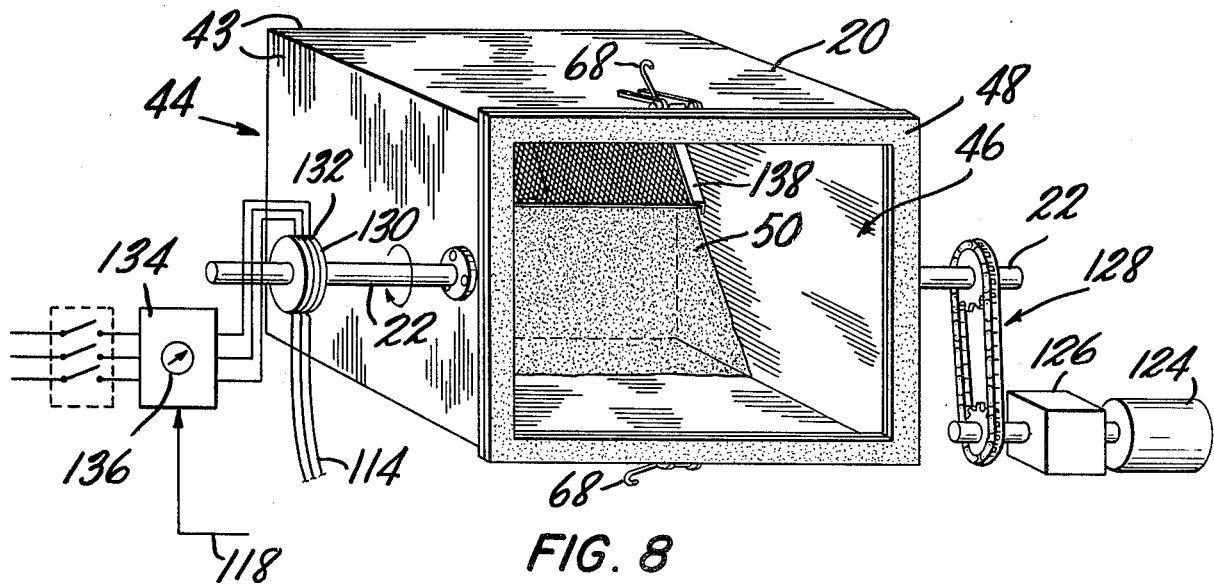
FIG. 8 is a perspective, and partly schematic illustration of the container and electric circuits for the apparatus of FIG. 1.

The container 20, and a mechanism for rotating the container is illustrated in FIG. 8. As explained above, the container has four side walls 43 and rear wall 44. The front of the container 46 is open and is provided with a resilient seal 48 made of foam rubber or cork, for example, around its face edge. Clamping hooks 68 are provided on at least two opposite sides near the front opening.

Attached to the container, and extending outwardly on opposite sides of a horizontal plane are two axially aligned shafts 22. The shafts 22 provide support for the container and permit the container to rotate in the manner described above.

Rotation of the container is effected by a motor 124, a speed-reduction gear box 126 and a chain and sprocket drive 128. Electrical power is supplied to the heat box, that rotates with the container 20, through suitable rotating collectors 130 and stationary brushes 132. The power is switched on and off by a control box 134 which contains one or more timers 136 and receives control signals from the heat box thermocouples on line 118.

The particulate plastic material 50 in the container 20 is moved about within the container as it is rotated. In this embodiment the container is provided with a perforated baffle 138 which extends from one side wall to the other diagonally downward from the upper corner of the rear wall 44. Another identical baffle, which is covered by the particulate plastic material 50 and is therefore not shown in FIG. 8, extends diagonally upward from the lower corner of the rear wall 44. The precise position of these two baffles 138 is shown in cross section in FIG. 9A. The purpose of the baffles 138 is to control the flow of particulate material onto the mold as the container 20 is rotated. Depending upon the type of mold, these baffles improve the distribution of the particulate material over the mold surface.

Figure 9A:
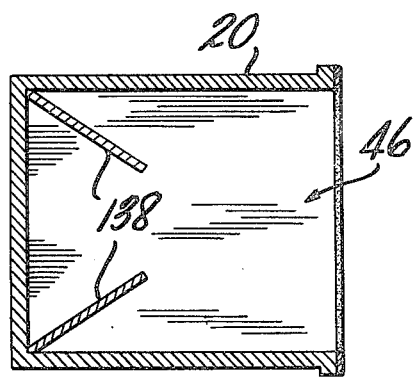
FIGS. 9A-9E are side, sectional views of a container which may be used in the apparatus of FIG. 1, showing various features and modifications.
Figure 9B:
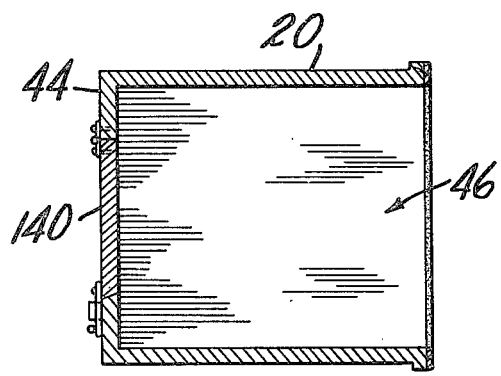

FIG. 9B shows a container 20 having a door 140 in its rear wall 44 to permit particulate plastic material to be removed and inserted when the front opening 146 is closed by the mold and mold platen assembly. This permits different plastic materials to be inserted into the container without removing the mold so as to build up layers of different plastics on the mold surface, thereby forming a laminated plastic article. As an example, a plastic article which is white on the inside and black on the outside may be formed by molding first with white particulate material, replacing the white material with black material through the trap door, and then molding with the black material.

Figure 9C:
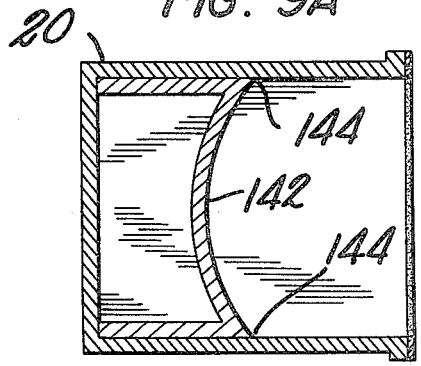

FIG. 9C shows another embodiment of the container 20 which is provided with an insert 142 removably mounted inside. This insert reduces the interior volume of the container to adjust for molds of small size. The insert 142 may be removed by detaching the latches 144 on the opposite side walls.

Figure 9D:
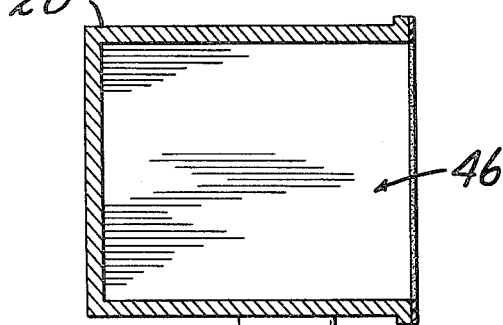

FIG. 9D shows a further embodiment of the container 20 which is provided with a vibrating mechanism 146. This mechanism 146 imparts vibrational energy to the container walls so that the particulate plastic material may be agitated as it settles over the mold. Such vibration causes the material to evenly surround the mold and is particularly advantageous when the mold surface includes indentation or projections.

Figure 9E:
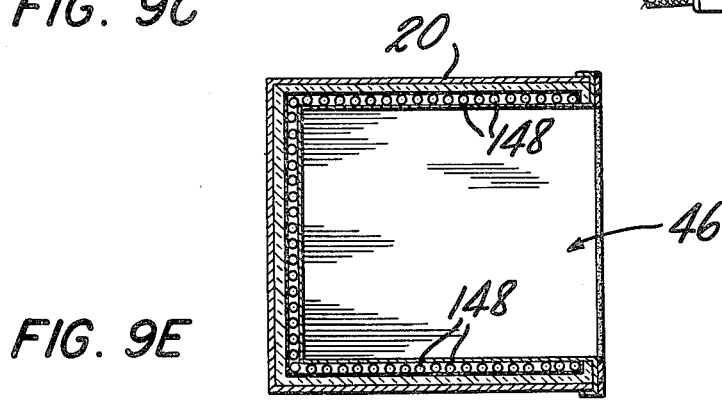

FIG. 9E shows an embodiment of the container 20 which is provided with heating coils 148 adjacent its inner surface. These coils may be constructed as tubes that carry a hot liquid or gas, such as steam, or they may simply be electrical heating elements connected to a suitable power source. While the container may be made of wood or some other insulating sheet material, it may also be constructed as a laminate with separate insulation as shown in the figure. The application of heat to the container makes it possible to maintain the particulate plastic material within the container at a temperature close to the fusing temperature to reduce the heating time when the mold is inserted.

Figure 9F:
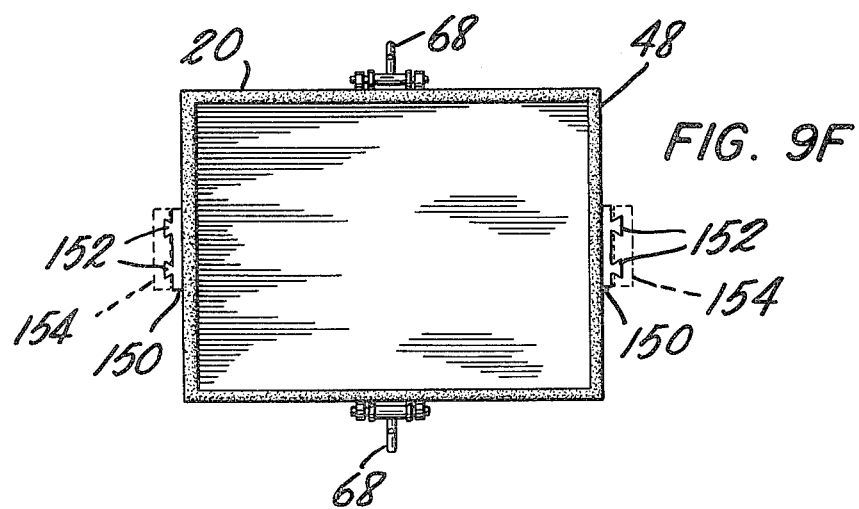
FIG. 9F is a front view of a container which may be used in the apparatus of FIG. 1 having guide plates for aligning the mold.

FIG. 9F shows another embodiment of the container 20, this time in front view. The figure shows the seal 48 and two clamping hooks 68. As is indicated also in FIG. 8, the clamping hooks each comprises a handle pivotally mounted on a side wall of the container 20 adjacent to the front opening 46 and a hook member pivotably attached to the handle between the handle ends. Also shown in FIG. 9F are guide plates 150, attached to opposite walls of the container, for aligning the mold platen with the container. The guide plates 150 are each provided with ribs 152 extending perpendicular to the plane of the front opening of the container. Mating guide plates 154, shown in dashed lines in FIG. 9F, are provided on the mold platen and extend forward to engage the guide plates 150 as the mold is inserted into the container.

The mold 40, which may assume virtually any configuration, is preferably made of welded aluminum due to its strength and high heat conductivity. However, any other metal, both sheet metal and cast metal may be used. In fact, thermosetting plastic, although not nearly as heat conductive as metal, may be also used to form the mold.

Figure 10A:
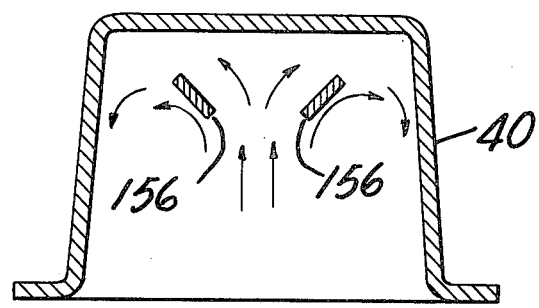
FIGS. 10A-10C are cross-sectional views through various molds which may be used with the apparatus of FIG. 1.

FIG. 10A illustrates one mold in cross section having internal baffles 156 to direct the heated air towards specific areas, such as the corners of the mold. By means of such baffles it is possible to "place" the heat and thereby control the thickness of the finished plastic article at specific locations.

Figure 10B:
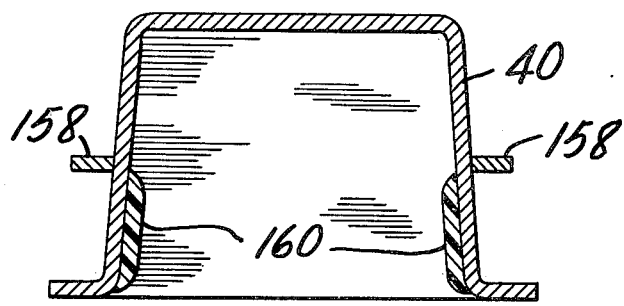

FIG. 10B shows a mold 40 with an adjustable flange ring 158 temporarily welded at a desired height on the sides of the mold. With such a flange, it is possible to produce plastic molded articles of any prescribed depth using a single original mold. Heat insulation 160 may be provided on the inner and/or outer surface of the mold so that heat is preferantially placed where the molded article is to be formed.

Figure 10C:
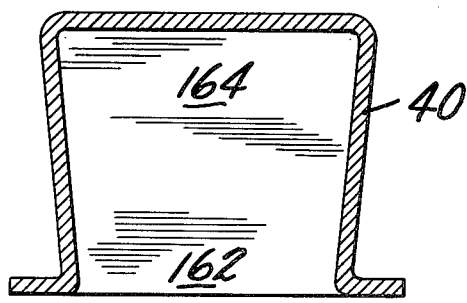

FIG. 10C shows a male 40 for a container which will have, when molded, a narrowed neck portion and an enlarged bottom portion corresponding to the regions 162 and 164 of the mold, respectively. This mold configuration is typical of many types of male molds having shaped sides which would not permit a plastic molded article, when formed, to simply slide off the top of the mold. Other mold configurations which present this same problem are those having an inwardly extending recess, at the base for example, or outwardly extending projections along the mold sides.

Figure 11A:
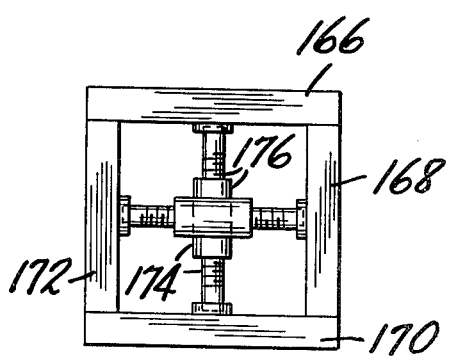
FIGS. 11A and 11B are bottom views of segmented, collapsible molds.
Figure 11B:
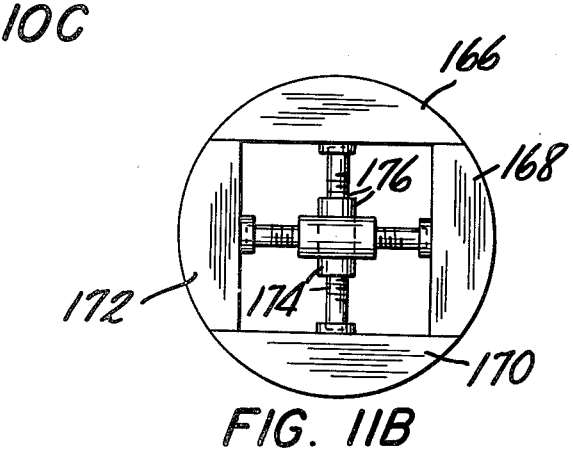

FIGS. 11A and 11B illustrate, in bottom view, rectangular and cylindrical molds, respectively, which overcome the problem of separation of the plastic molded article and the mold when the mold has a configuration of the type described above. As may be seen, the mold is formed as a collapsible, segmented unit, which may be taken apart when the molding process is complete and removed from the inside of the plastic molded article. In both the embodiments illustrated in FIG. 11A and FIG. 11B, the mold is formed of four segments 166, 168, 170 and 172, held in position, during molding, by two adjustable bars 174 and 176. When the mold is to be "collapsed", the mold segments 168 and 172 are first drawn inward, away from the inner surface of the plastic molded article, and removed from the article. Thereafter, the other two segments 166 and 170 are similarly drawn inward and removed. Consequently, the male mold utilized in the practice of the present invention may assume virtually any configuration, and need not be restricted by the requirement that the plastic molded article is to be slid off the outside surface of the mold.

Figure 12:
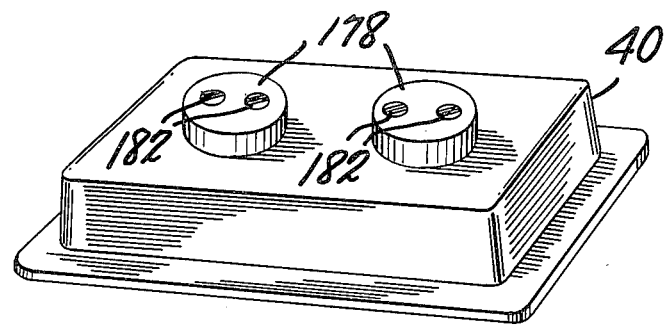
FIG. 12 is a perspective view of a mold having projections for forming openings in a molded article.
Figure 13:
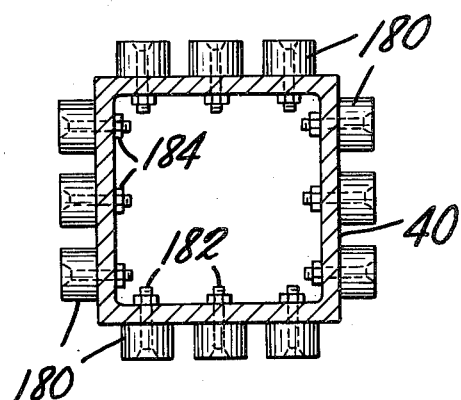
FIG. 13 is a cross-sectional view through a mold having projections for forming openings in a molded article.

FIGS. 12 and 13 illustrate how the present invention may be used to form plastic molded articles having holes or openings therein. In particular, the hollow heat conductive mold core 40 may be provided with projections of any shape, anywhere on its surface, made of non-heat conductive material such as Teflon or Nylon. While FIG. 12 shows two large projections 178, FIG. 13 shows a large number of small projections 180 arranged around the laternal sides of the mold core 40. The projections are attached to the mold core by means of bolts 182 and nuts 184 in the embodiment shown in FIG. 13. The projections must be unbolted and detached from the mold core before the plastic molded article may be removed.

Figure 14B:
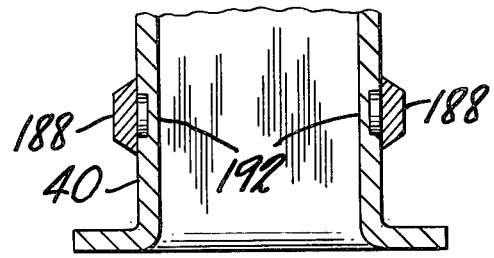
FIGS. 14A and 14B are cross-sectional views through molds having mold attachments for forming recesses in the interior surface of a molded article.
Figure 14A:
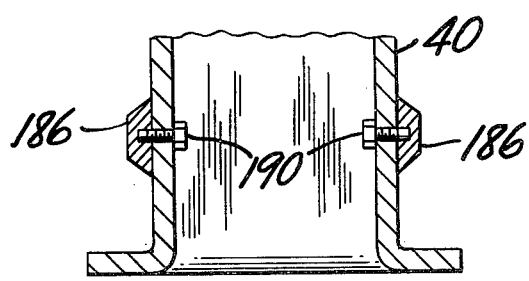

FIGS. 14A and 14B illustrate how a mold 40 may be provided with heat conductive attachments 186 and 188, respectively, for producing plastic molded articles with undercuts or recesses in their interior surface. These attachments 186 and 188 are preferably made of metal, such as aluminum or steel. They are formed in the precise shape desired for the interior surface of the molded article and attached to the mold 40 in such a way that they can be detached when the article is to be removed from the mold. In the embodiment of FIG. 14A the attachments 186 are connected to the mold by means of bolts 190 which may be removed, prior to removal of the plastic molded article, by unscrewing them from inside the mold. In the embodiment of FIG. 14B, the attachments 188 are made of magnetizable material such as iron or steel and are held in position by permanent magnets 192 embedded in the exterior surface of the mold 40. In both embodiments of FIG. 14A and 14B, the attachments 186 and 188 are removed from the mold 40 together with the plastic molded article, and then are removed by hand from inside the article. If desired, these attachments may be allowed to remain in the plastic molded article as reinforcements.

Figure 15:
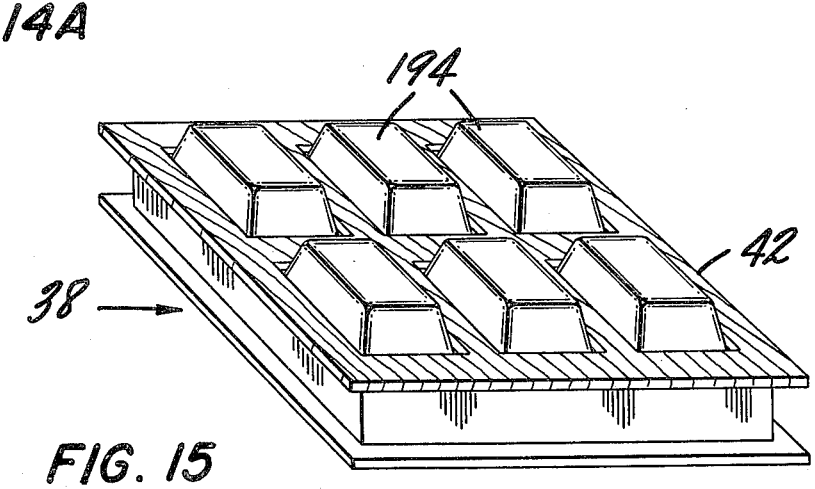
FIG. 15 is a perspective view of a plurality of molds arranged on a common platen.

FIG. 15 shows a single mold platen 38 adapted to carry a plurality of individual molds 194. A single upper flange 42 of non-heat conductive material such as wood or plastic is provided to define the areas in which the particulate plastic material will be heated and fused to the individual molds. With a platen and molds of this type, a plurality of molded articles may be formed in one heating and cooling cycle. The manner of attaching the molds 194 to the platen 38 is completely analogous to the arrangement described above and illustrated in FIG. 5.

Figure 16:
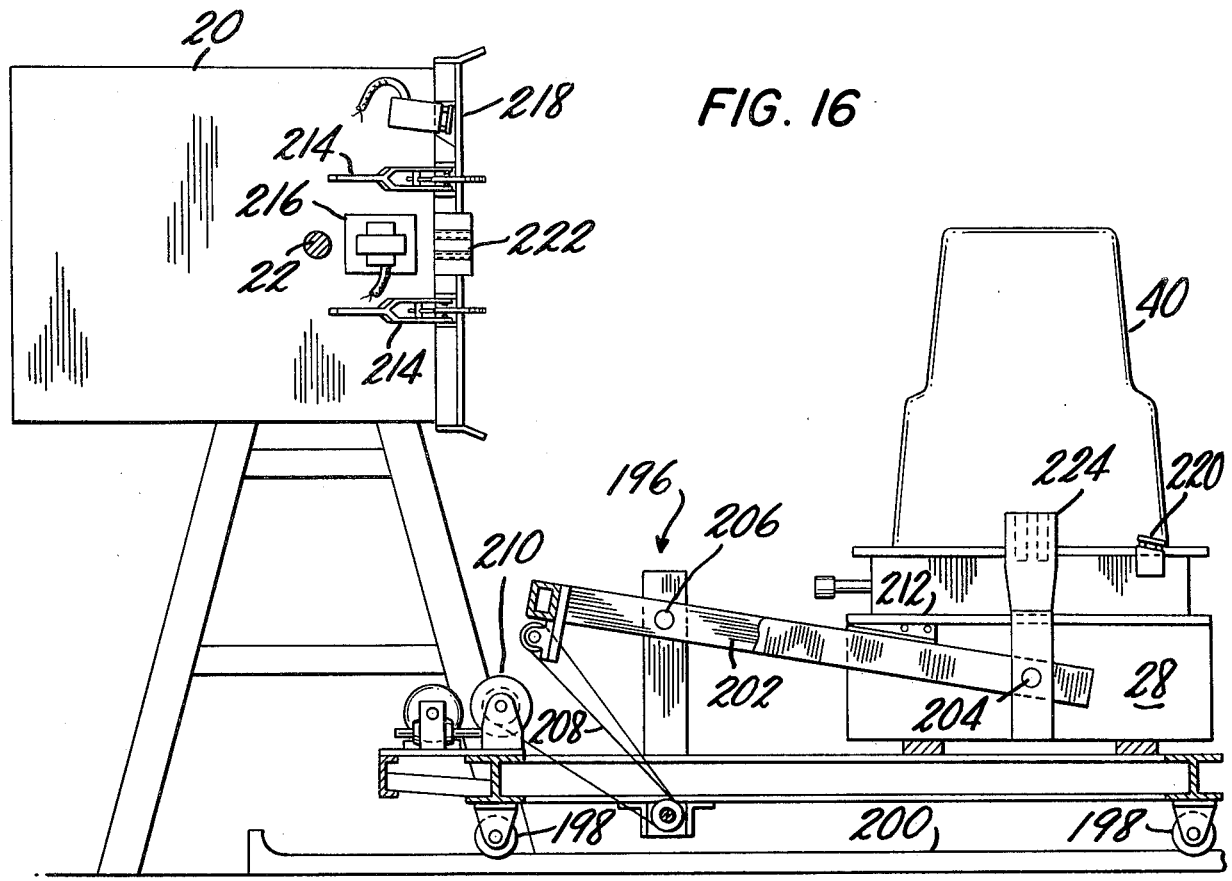
FIGS. 16 and 17 are side elevational views of another embodiment of apparatus according to the present invention for forming molded plastic articles from particulate plastic material.
Figure 17:
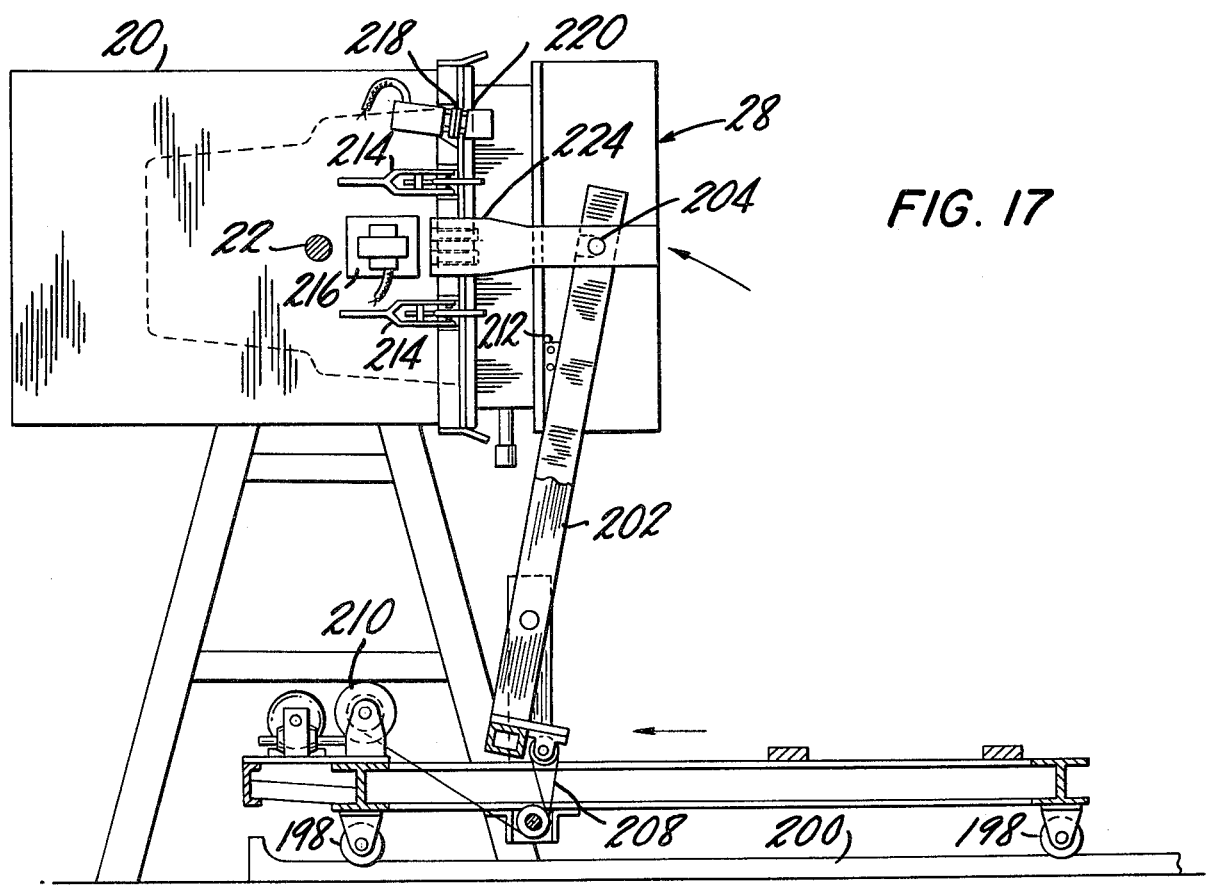

FIGS. 16 and 17 illustrate another embodiment of plastic molding apparatus according to the invention which is capable of handling large molds for forming large plastic containers and the like. For example, the mold 40 illustrated in these figures is approximately 3 feet wide and 4 feet deep. The container 20 is appropriately dimensioned to receive this mold.

In order to retain the mold 40 at a convenient height for manual transfer from a cooling dolly to the heat box 28, the heat box is carried on a transport unit 196 having wheels 198 arranged on a track 200 fixed to the floor. The transport unit is provided with a pair of support arms 202 which grasp the heat box 28 by pinions 204 on either side and raise it up to the mounting position shown in FIG. 17. The mold, mold platen and heat box combination are prevented from rotating counterclockwise by a block 212 on the side of the heat box. Once the mold, platen and heat box are clamped into position by the clamps 214, the arms 202 are lowered and the transport unit 196 is moved away.

In addition to the clamps 214, which are identical to the clamps 68 described previously, the container 20 is provided with a vibrating unit 216 for imparting vibrational energy to the container; contactors 218 for supplying electrical power from the container to the heat box via mating contactors 220; and guide plates 222 on opposite sides of the type described above and shown in FIG. 9F. The guide plates 222 mate with the corresponding guide plates 224 on opposite sides of the mold.

Figure 18:
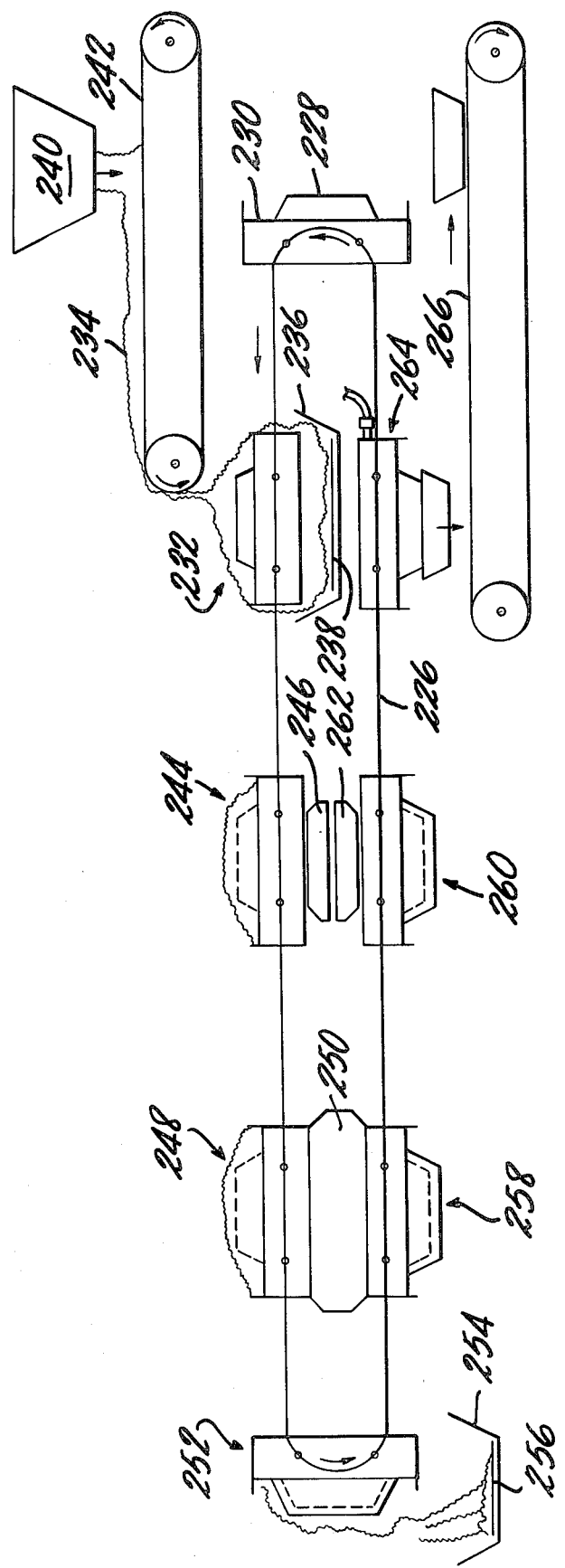
FIG. 18 is a schematic illustration of another embodiment of apparatus according to the present invention for forming molded plastic articles from particulate plastic material.

FIG. 18 illustrates an embodiment of apparatus according to the present invention which serves to form plastic molded articles in a continuous process. As may be seen, the apparatus includes a conveyor 226 to which are connected a number of units, each comprising a mold 228 and mold platen 230. The conveyor moves intermittently to propel the mold and platen units from one process stage to the next.

At the first process stage 232 particulate plastic material 234 is loaded onto the top of the mold and platen. Excess material drops into a hopper 236 and is carried off by a conveyor belt 238. This excess material is returned to a hopper 240 for delivery to the stage 232 by a conveyor 242.

At the second stage 244 of the process, the mold and platen unit is vibrated by a vibrating device 246. The mold and platen unit rides up over this vibrating device when it is moved to this second stage.

At the third stage 248 of the process, heat is applied to the interior of the mold from a heating unit 250. This heating unit operates in substantially the same manner as the heat box 28 described above and shown, for example, in FIGS. 6 and 7.

After the material at the surface of the mold has been fused, the mold and platen unit is moved to the next stage 252 at which the excess particulate material is removed. This material falls into a hopper 254 and is carried away by a conveyor belt 256 and returned to the hopper 240. Thereafter, the mold and platen unit is moved to the fuse-out stage 258 where it again receives heat from the heating unit 250. Subsequently, it is moved to the cooling stage 260 and cool air is blown into the interior of the mold by a cooling unit 262. This cooling unit may comprise a fan and baffles as are described above in connection with FIG. 3.

Finally, the mold and platen unit is moved to the ejection stage 264 at which air is directed to the outside surface of the mold to remove the molded plastic article. The article drops onto a conveyor belt 266 which moves it away from the conveyor 226.

The entire apparatus shown in FIG. 18 is covered by a suitable shroud to prevent the particulate plastic material from entering the atmosphere.

The process according to the present invention for forming molded articles from particulate plastic material has now emerged from the above description of the apparatus as shown in FIGS. 1–18. However, the parameters of this process warrant some further discussion. Generally, the process comprises the steps of:

(a) surrounding a hollow, heat-conductive male mold with particulate plastic material;

(b) applying heat to the interior of the mold until the temperature of the outer surface of the mold is above the fusion temperature and below the melting temperature of the particulate plastic material;

(c) applying heat to the interior of the mold so as to maintain the temperature of the outer surface of the mold above the fusion temperature of the particulate plastic material, thereby to form a molded article on the outer surface of the mold;

(d) removing loose particulate material from the molded article;

(e) applying heat to the interior of the mold so as to cause the outer surface of the molded article to become smoother;

(f) cooling the molded article to substantially room temperature or until it becomes fairly solid; and (g) removing the molded article from the mold.

The particulate plastic material utilized in forming the molded article may be any thermoplastic which forms a solid at room temperature. Preferred materials, and suggested sources for these materials, are as follows:

Polyethylene—Chemplex, USI Chemicals, or equivalent.
Polypropylene—Hercules powder or equivalent.
Polycarbonate—GE "Lexan" or equivalent.

The particle size of the plastic material has a preferred upper limit of approximately 200 microns (diameter). Larger particles result in an undesirably coarse product. The thermoplastic material preferably has a relatively low melt index because, in general, the longer the time it takes to form the plastic article, the stronger it will be. A melt index in the range of 0.5 to 20 is preferred. As explained above, the plastic material surrounding the mold is heated to a temperature between the fusion and melting temperatures of the particular material used. The longer this temperature is applied to the mold while the particulate plastic material surrounds the mold, the thicker the molded article will be.

Figure 19:
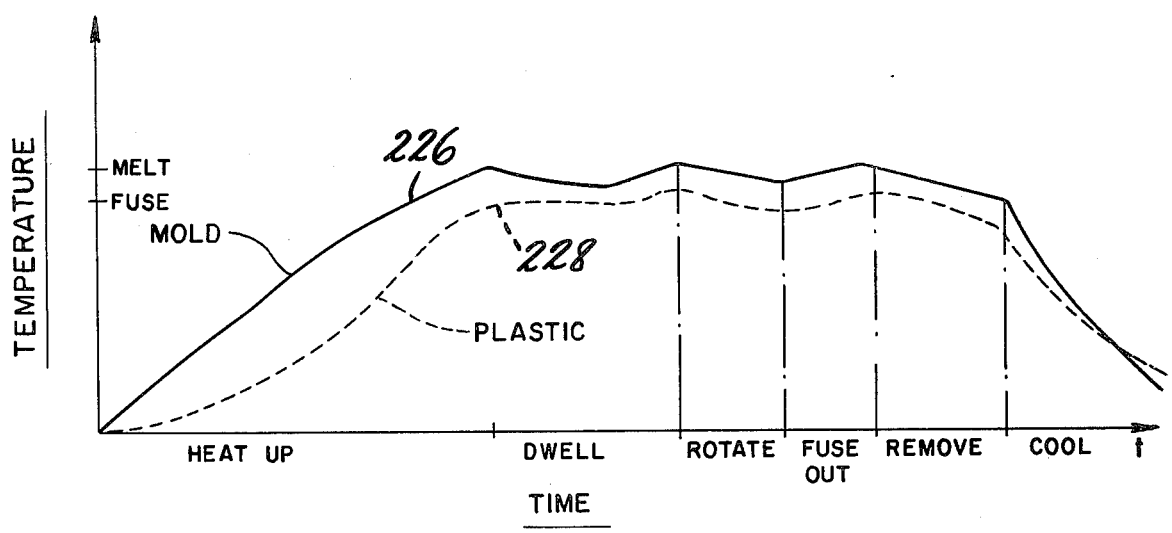
FIG. 19 is a coordinate diagram showing the time-temperature relationship in a typical molding process according to the present invention.

FIG. 19 shows a time-temperature diagram for a typical molding process. In this diagram the mold temperature is indicated by a solid line 226, whereas the temperature of the plastic immediately surrounding the mold is indicated by a dashed line 228. It is assumed, in the case illustrated, that the particulate plastic material starts at substantially room temperature, although as has been explained above in connection with FIG. 9E, the plastic material may be maintained at a temperature slightly below its fusion temperature to shorten the warm-up time.

During the initial phase, when the mold is surrounded by particulate plastic material, the mold and the surrounding plastic is heated rapidly to a temperature above the fusion temperature of the material. If the temperature were allowed to continue to rise to above the melting temperature of the material, the plastic would turn to a liquid at the surface of the mold and flow down to the base of the mold. Consequently, it is important to maintain the temperature of the mold below the melting temperature of the plastic.

After the plastic has reached the desired temperature at the surface of the mold, the mold is maintained at a substantially constant temperature (usually cycling between two slightly different temperatures as described above in connection with FIGS. 6 and 7). During this "dwell" time, the particulate plastic material at the surface of the mold fuses together. The longer this temperature is maintained with the particulate material surrounding the mold, the thicker the plastic article will be because the heat of the mold is conducted outward through the plastic material and fuses material at an ever-increasing distance from the mold.

When the desired thickness of the article is reached, the mold is rotated to remove the loose particulate material from the fused molded article. Thereafter, the temperature is maintained on the mold to "fuse out" the article, causing the outer surface of the article to become smoother.

Finally, heat supplied to the interior of the mold is switched off and the mold, with its surrounding plastic article, is removed from the container or from the stage at which the fuse-out heat is applied. Finally, a cooling medium, such as air, is applied to the interior of the mold to rapidly cool the mold and the surrounding article. Once the article is brought down to room temperature it is removed from the mold.

Although FIG. 19 shows rapid cooling of the mold and article, internal stresses in the article may be minimized by allowing it to cool slowly. If the article is thus annealed it will exhibit no "memory"; i.e., it will always return to its original shape after warping or bending.

It is possible to insert additives into the particulate plastic material to achieve desired results. For example, a foaming agent such as Celogen, which is available commercially from U.S. Royal, may be added at the rate of $\frac{1}{2}$ pound for each 100 pounds of plastic to create pores in the plastic molded article. As mentioned above, laminated articles may also be formed by carrying out the process according to the present invention using several different plastic materials. For example, a thin layer of non-porous plastic may be formed on the side of the mold, followed by a layer of foamed plastic, thereby producing a light container with a non-porous interior surface. The sequential process steps of forming different layers of plastic on the mold may be carried out either by replacing material through a trap door in a single container as shown in FIG. 9B, or by successively inserting the mold in a plurality of containers, each with a different plastic material.

In order to facilitate removal of the article, a non-stick coating of Teflon of silicone may be sprayed or painted onto the outer surface of the mold before it is inserted into the container. Such coatings are commercially available and are known as a "mold release".

Particularly if the mold has undercuts on its outer surface, or is otherwise not completely uniform, the mold or the container are preferably subjected to a mechanical vibration between the time that the particulate plastic material is poured over the mold and the time that the heat is applied to the interior of the mold. Such vibration disperses and distributes the particulate material evenly around the mold. It has been found that 60 cycle vibration for a period of about two minutes is sufficient for this purpose.

An example of the production of a plastic molded article in accordance with the process according to the present invention is as follows:

Medium density polyethylene in a 35 micron powder with a melt index of approximately 1.5 to 2 is placed in the container. The mold is inserted and heat is applied for approximately 10 minutes to raise its temperature to 300°. Thereafter, the temperature is maintained at 300° for approximately 3 minutes ("dwell"), depending upon the desired product size, shape and thickness. The container with the mold are then rotated to remove the loose material from the mold. Thereafter, the temperature is maintained at 300° for 3–5 minutes to allow the outer surface of the article to "fuse out".

The mold with the fused article is removed from the container and rapidly cooled by directing air at room temperature against the inner surface of the mold. Finally, the article is removed from the mold and sanded, where necessary, to eliminate rough edges.

While there have been described what are believed to be the preferred embodiments of the present invention, those skilled in the art will recognize that various changes and modifications may be made thereto without departing from the spirit of the invention, and it is intended to claim all such embodiments as fall within the true scope of the invention.

We claim:

1. Apparatus for use in forming molded articles from particulate plastic material by (a) surrounding a hollow, heat-conductive male mold with particulate plastic material;

(b) applying heat to the interior of the mold until the temperature of the outer surface of the mold is above the fusion temperature and below the melting temperature of the particulate plastic material;

(c) applying heat to the interior of the mold so as to maintain the temperature of the outer surface of the mold above the fusion temperature of the particulate plastic material, thereby to form a molded article on the outer surface of the mold;

(d) removing loose particulate material from the molded article;

(e) applying heat to the interior of the mold so as to cause the outer surface of the molded article to become smoother;

(f) cooling the molded article to substantially room temperature or until it become fairly solid; and (g) removing the molded article from the mold, said apparatus comprising: an open container formed by side walls and a rear wall and having a front opening including face edges whereby particulate material may be introduced into and removed from said container through said front opening, pivot means attached to opposite sides of said container for rotatably holding said container;

drive means for rotating said container about said pivot means;

means for clamping both a male mold and a means for removably heating said mold to the front opening of said container, whereby said male mold and said means for heating said mold are adapted to rotate with said container, means for imparting vibrational energy to particulate material within said container to cause said particulate material to surround said mold, and means for removing a formed molded article from said male mold.

2. Apparatus as claimed in claim 1, wherein said container includes a door in at least one of said side and rear walls, whereby particulate material may be added to or withdrawn from the interior of said container while a male mold is clamped to the front opening thereof.

3. Apparatus as claimed in claim 1, wherein said container includes baffle means disposed in its interior for distributing said particulate material evenly around the male mold when the container is rotated about said pivot means.

4. Apparatus as claimed in claim 3 wherein said baffle means include at least one baffle plate protruding into the interior of the container from the rear wall thereof, and extending from one side to the other of said container.

5. Apparatus as claimed in claim 1, wherein said clamping means comprises at least one handle means, pivotably mounted on at least one wall of the container adjacent to the front opening thereof, and engaging means, pivotally attached to said handle means between the ends of said handle means, for holding cooperating engaging means attached to said mold.

6. Apparatus as claimed in claim 1, further comprising a plurality of alignment means, attached to at least one wall of the container adjacent to the front opening thereof, for engaging cooperating alignment means attached to said mold to hold said mold in alignment on said front opening when it is clamped to said container.

7. Apparatus as claimed in claim 6, wherein said alignment means include a plate, attached to said container wall, having at least one rib disposed thereon and extending perpendicular to the plane of the front opening of said container.

8. Apparatus as claimed in claim 1 further comprising resilient sealing means, disposed on the face edges of the front opening of the container, for forming a leakproof seal when said male mold and said means for heating said male mold are clamped to said front opening.

9. Apparatus as claimed in claim 1 further comprising at least one insert removably mounted within said container, whereby the interior volume of said container may be adjusted as a function of the size of the male mold.

10. Apparatus as claimed in claim 1 further comprising means, disposed on said container for preheating particulate material within said container before said male mold and said means for heating said mold are clamped thereon.

11. Apparatus for use in forming molded articles from particulate plastic material by (a) surrounding a hollow, heat-conductive male mold with particulate plastic material;

(b) applying heat to the interior of the mold until the temperature of the outer surface of the mold is above the fusion temperature and below the melting temperature of the particulate plastic material;

(c) applying heat to the interior of the mold so as to maintain the temperature of the outer surface of the mold above the fusion temperature of the particulate plastic material, thereby to form a molded article on the outer surface of the mold;

(d) removing loose particulate material from the molded article;

(e) applying heat to the interior of the mold so as to cause the outer surface of the molded article to become smoother;

(f) cooling the molded article to substantially room temperature or until it becomes fairly solid; and (g) removing the molded article from the mold, said apparatus comprising: an open container formed by side walls and a rear wall, pivot means attached to opposite sides of said container for rotatably holding said container, a hollow, heat-conductive male mold mounted on a base which is open to permit air to communicate to the interior of the mold, said mold being proportioned to fit within said container when said base is placed against the front opening of said container;

a heat box, formed by side walls and a rear wall, thereby leaving a front opening, said heat box containing means for heating air, temperature sensing means, fan means for passing air through said heating means and for forcing heated air out through said front opening, and means, connected to said temperature sensing means for controlling said heating means, means for removably attaching the base of said male mold to the front opening of said heat box, so as to form a substantially air-tight seal;

means for moving said heat box and said mold when attached to each other into position to be clamped to said container with said mold in the interior of said container; and clamping means for removably clamping said heat box and said mold to the front opening of said container, with said mold in the interior of said container, so as to form a substantially air-tight seal.

12. Apparatus as claimed in claim 11 further comprising a cooling stand having support means for holding said mold and having means for directing a cooling medium into the interior of said mold.

13. Apparatus as claimed in claim 12 wherein said cooling stand is supported by wheel means, whereby said cooling stand may be wheeled away from said container to permit forming of other molded articles during cooling of said mold.

14. Apparatus as claimed in claim 11 wherein said means for moving said heat box and said mold into position to be clamped to said container comprises:

a support member supported by wheel means;

a pair of arms, each pivotably mounted at one end to said support member and having means at the opposite end for holding said heat box and said mold;

drive means for pivoting said arms from a lowered position in which said heat box and said mold are at rest into a raised position in which said heat box and said mold are in alignment with the front opening of the container.

15. Apparatus for use in forming molded articles from particulate plastic material, comprising:

a hollow, heat-conductive male mold on the outside surface of which an article may be formed from particulate plastic material upon application of heat to the interior of the mold;

a conveyor, having means for holding said mold, for moving said mold to a plurality of stages;

means, at a first stage, for surrounding said mold with particulate plastic material;

means, at a second stage, for applying heat to the interior of the mold until the temperature of the outer surface of the mold is above the fusion temperature and below the melting temperature of the particulate plastic material, so as to form a molded article on the outer surface of the mold;

means, at a third stage, for removing excess particulate material from the molded article;

means, at a fourth stage, for applying heat to the interior of the mold so as to cause the outer surface of the molded article to become smoother;

means, for cooling the molded article subsequent to the fourth stage;

means, at an ejection stage, for removing the molded article from the mold.

16. Apparatus as claimed in claim 15 further comprising vibrating means for imparting vibrational energy to said mold to cause the material to surround said mold before heat is applied thereto.

* * * * *